United States Patent [19]

Foster et al.

[11] Patent Number: 4,916,688

[45] Date of Patent: Apr. 10, 1990

[54] DATA STORAGE METHOD USING STATE TRANSFORMABLE MATERIALS

[75] Inventors: John S. Foster, San Jose; Kurt A. Rubin, Santa Clara; Daniel Rugar, Palo Alto, all of Calif.

[73] Assignee: International Business Machines Corporation, Armonk, N.Y.

[21] Appl. No.: 175,835

[22] Filed: Mar. 31, 1988

[51] Int. Cl.⁴ .................. G11B 9/10; G11C 11/00
[52] U.S. Cl. ........................... 369/126; 365/151; 365/113
[58] Field of Search ............... 250/306, 307; 365/163, 365/113, 106, 45, 114, 126, 128, 182–184, 157; 369/126

[56] References Cited

U.S. PATENT DOCUMENTS 3,530,441  9/1970  Oushinsky ..................... 365/113
3,778,785  12/1973  von Gutfeld ................. 340/173 LS
4,575,822  3/1986  Quate ........................... 365/174

OTHER PUBLICATIONS

"Data Storage System", #28130, British Journal, Research Disclosure, Sep. 1967.

Primary Examiner—Robert L. Richardson
Assistant Examiner—James E. Tomassini
Attorney, Agent, or Firm—Henry E. Otto, Jr.

[57] ABSTRACT

A unique method for recording, reading and erasing data bits in a data storage device is described. Using extended scanning tunneling microscopy (STM) techniques, a tunneling electron current by resistive heating selectively melts discrete areas of a state-transformable film; then heat is dissipated rapidly, writing data bits by changing the film in said areas from a first state to a second state wherein an electronic property, such as conductance, work function or band gap, in said areas is changed.

Again, using extended STM techniques, the effect of this changed electronic property of said film on the tunneling current is measured for reading the written data bits. Minimizing the effect of blemishes on the material is effected, during operation in STM constant current mode by measuring dI/dV or dI/ds, and during operation in STM variable current (constant gap) mode by measuring (dI/dV)/I or (dI/ds)/I.

Also by using extended STM techniques, data bits can be selectively erased by resistance heating the film to a temperature higher than the crystallization temperature for a sufficient period of time, restoring selected discrete areas to said first state and each affected electronic property substantially to its original condition.

18 Claims, 2 Drawing Sheets

DATA STORAGE METHOD USING STATE TRANSFORMABLE MATERIALS

TECHNICAL FIELD

This invention relates to methods of storing data using storage materials whose phase or state is changed by scanning tunneling microscopy (STM) techniques, and more particularly to methods for recording, reading and erasing data bits by extending STM techniques to alter and measure electronic properties of the storage materials as part of the writing, erasing and reading process.

BACKGROUND OF THE INVENTION

In recent years, there has been considerable interest in adapting STM apparatus and methods for use in direct access storage devices because of their potential for ultrahigh density recording.

U.S. Pat. No. 4,575,822 discloses a data storage device in which data are written by establishing physical, electrical or magnetic perturbations in a flat storage surface on a substrate. Using STM techniques, the data are thereafter read by establishing a tunneling electron current between the surface and a movable probe. The physical perturbations are created by a physical probe, a focused laser beam, an electron beam or other forms of radiation beams and particle beams, or the perturbations can be created by deposited conductive, insulative or magnetic particles. In each such case, the storage surface is damaged or marred during creation of the physical perturbation. The only way suggested for erasing physical perturbations is by bulk annealing. Note that the written data are read by measuring tunnel electron currents or sensing stored charge rather than by measuring the effects on tunneling current of changes in electronic properties, such as conductance, work function or band gap, caused by changes in state or phase of the storage material; and there is no teaching of using the STM techniques for selectively erasing data by selectively inducing a change in state of the storage surface. "Conductance", as herein used, is defined as the derivative of current vs. voltage, and may be a function of voltage.

Research Disclosure 28130 published in the September 1987 edition of the British Journal suggests use of STM technology with laser or particle-beam induced changes to write data on an optical disk by changing the state of the magnetic coating by polymerization or electro-erosion. These phase changes could involve transitions from crystalline to amorphous states. The process is directed to write-once recording with no mention of any readout mechanism; there is no teaching of a method or means for sensing changes in electronic properties or erasing the data and enabling the disk to be reused. The writing process mentioned only refers to electrons striking the media, implying the tip is negative with respect to the media; there is no suggestion of resistive heating or of the advantage of using a tip which is positive during writing to achieve advantages hereinafter described.

Copending application U.S. Ser. No. 07/090,636, filed Aug. 28, 1987 (Docket SA9-84-047X), assigned to the assignee of the present invention, discloses a process employing a film which, when melted in selectable discrete areas by a laser and cooled at one rate, changes from a crystalline to amorphous state for writing discrete data, and when heated by the same or a different laser and cooled at a different (slower) rate, erases such data. Various film materials are disclosed which exhibit a change in optical characteristics dependent upon their selected state. There is no teaching of use of STM techniques to alter any electronic property of the film for writing data, sensing the effect of the property on the tunneling current to read the data, and altering the property to erase the data. There is no disclosure as to how the data, once written, is read before erasure.

SUMMARY OF THE INVENTION

According to the invention, a unique method is provided for recording, reading and erasing data bits in a data storage device. This method involves use of a storage medium comprising a preferably conductive substrate and a film of phase or state-transformable material thereon. Using extended STM techniques, a tunneling electron current by resistive heating selectively melts (or heats above the crystallization temperature) discrete areas of the film after which heat is dissipated from said areas rapidly for writing data bits by changing the film in said areas from a first state to a second state wherein an electronic property, such as conductance, work function or band gap, in said areas is changed.

Again, using extended STM techniques, the effect of this changed electronic property of said film on the tunneling current is measured for reading the written data bits. Minimizing the effect of blemishes on the topography of the state-transformable material is effected, during operation in STM constant current mode by measuring dI/dV or dI/ds, and during operation in STM variable current (constant gap) mode by measuring (dI/dV)/I or (dI/ds)/I.

Also by using extended STM techniques, data bits can be selectively erased by resistance heating the film to a temperature higher than the crystallization temperature for a sufficient period of time. This restores the selected discrete areas of the film to said first state and restores each affected electronic property substantially to its original condition. The film may be stable in one of the states and metastable in the other state; e.g., crystalline in the one state and amorphous in the other. Materials suitable for practicing this method and preferred modes for reading to compensate for slight imperfections in the film surface are hereinafter described.

DESCRIPTION OF PREFERRED EMBODIMENTS PRELIMINARY DESCRIPTION

Figure 1:
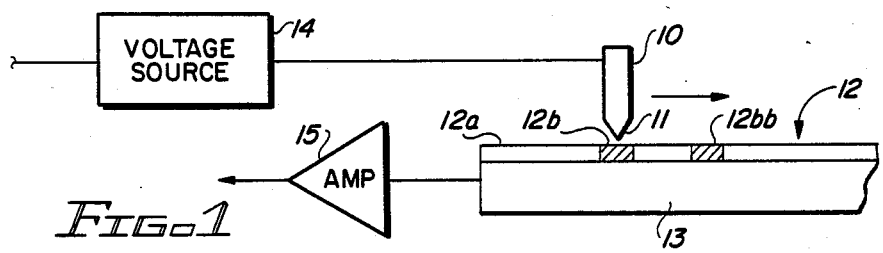
FIG. 1 is a simplified schematic diagram showing the basic components of an apparatus for practicing the invention.

FIG. 1 depicts the basic components of an STM-type apparatus required to practice the method according to the invention. For a comprehensive description of an STM-type apparatus to practice the invention, the reader is referred to U.S. Pat. No. 4,724,318 (particularly the description in connection with FIG. 3) and/or U.S. Ser. No. 07/146,999, filed Jan. 22, 1988 which description is incorporated herein by reference.

As illustrated in FIG. 1, a conducting probe 10 having a tip 11 is disposed closely adjacent (e.g., about 10 angstroms from) a thin layer or film 12 of storage material provided on a conducting substrate 13. Probe 10 is movable in x, y and z directions by means (not shown) described in the referenced patent. Film 12 is composed of a material which is capable of changing phase or state in the following manner:

(a) From crystalline to amorphous, by selectively melting discrete areas of crystalline material and allowing the respective areas to cool rapidly into the amorphous state;

(b) From amorphous to crystalline, by selectively heating discrete areas of amorphous material above the crystallization temperature of the material for a preselected time greater than the material's crystallization time (i.e., the minimum time needed to effect crystallization);

(c) From amorphous to crystalline, by selectively heating discrete areas of amorphous material above the melting point of the material. Adequate heat is applied during this melting step such that after the melting pulse ends, the time to cool the selected area from the melting temperature to the crystallization temperature is greater than the minimum time to crystallize said area.

GENERAL DESCRIPTION

Figure 2:
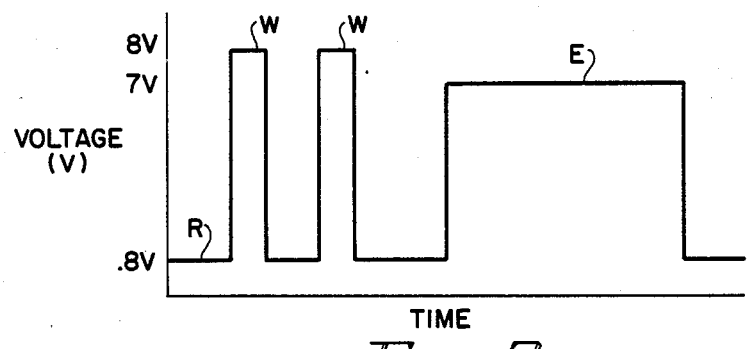
FIG. 2 is a voltage vs. time diagram showing voltage amplitude and duration for writing, reading and erasing data bits.

Assume initially, for sake of illustration, that film 12 is normally in a crystalline state, as shown at 12a, and is devoid of any data. To write a data bit 12b, voltage source 14 is conditioned to provide a short duration high level (e.g., 8 volt) pulse W (FIG. 2) for causing a tunneling electron current to be supplied to the probe tip 11. Source 14 may be a Model 8112A voltage pulse generator marketed by Hewlett-Packard Company. This current resistively heats and melts a discrete area 12b of film 12 causing a change in phase or state from the crystalline to an amorphous state. The heat dissipation characteristics of film 12 and substrate 13 are such that the film will cool rapidly and not return to its original (assumed crystalline) state. To write additional data bits, such as 12bb, tip 11 and film 12 are moved relative to each other and additional voltage pulses W are generated in similar manner for causing similar state changes at other selected discrete areas along the film.

Figure 3A:
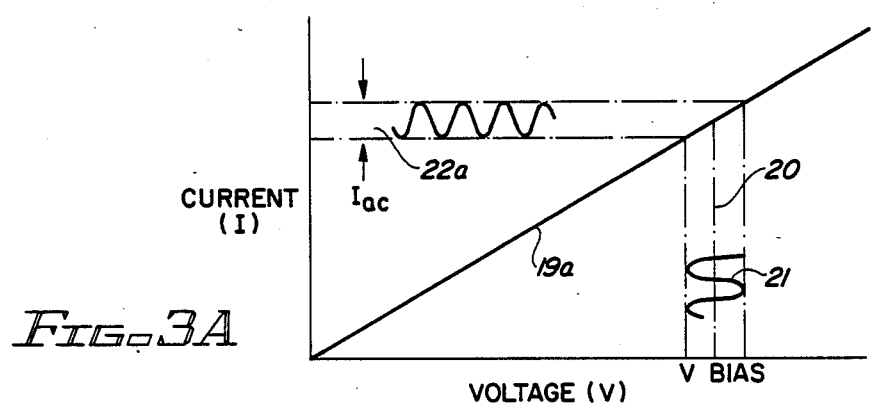
FIGS. 3A and 3B are plots of current vs. voltage, including differences in alternating current amplitude at a preselected direct current bias voltage when the state-transformable material is in its crystalline and amorphous states, respectively.

A DC voltage R (e.g., 0.8 volt) is normally maintained between tip 11 and film 12 for causing data to be read as the tip moves relative to the film. If preferred, it may have a superimposed oscillating voltage as shown in FIGS. 3A and B, and later described.

While the tip is spaced above the crystalline area, like 12a, it will indicate, in the example assumed, that the data is "0". However, when during movement of the tip relative to the film, the tip is over an amorphous spot or area, such as 12b (as shown in FIG. 1) or other amorphous areas, such as 12bb, the tunneling current will change due to the changed conductance at a particular voltage of the amorphous areas relative to the crystalline areas. "Conductance", as heretofore defined, is the derivative of current vs. voltage, and may be a function of voltage.

Figure 4:
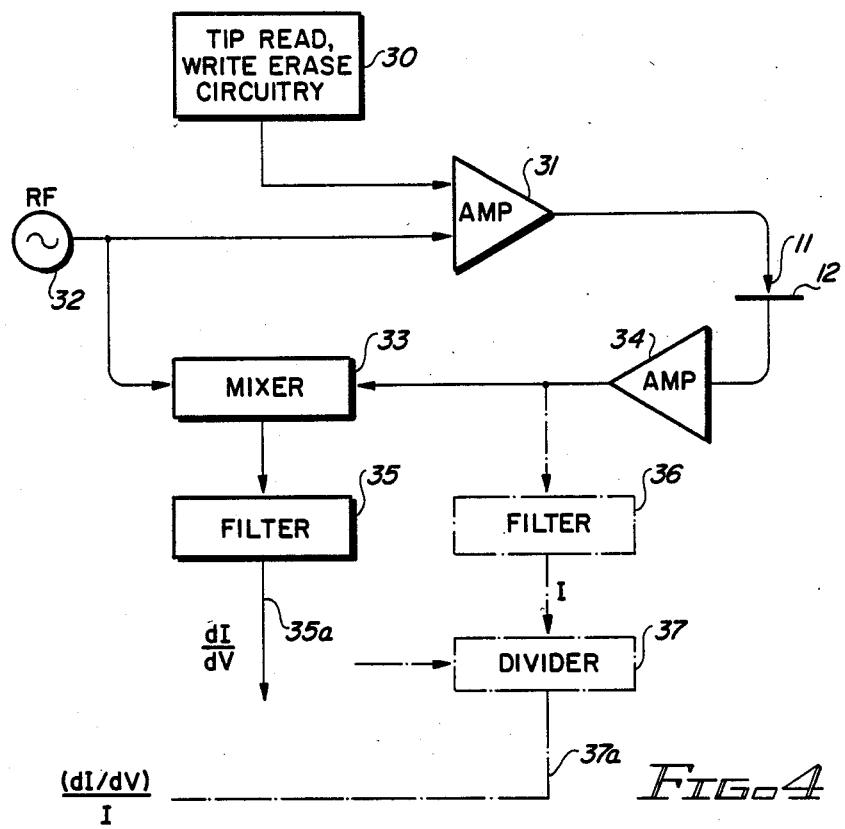
FIG. 4 schematically depicts apparatus for determining the slope, dI/dV,/using a mixer.
Figure 5:
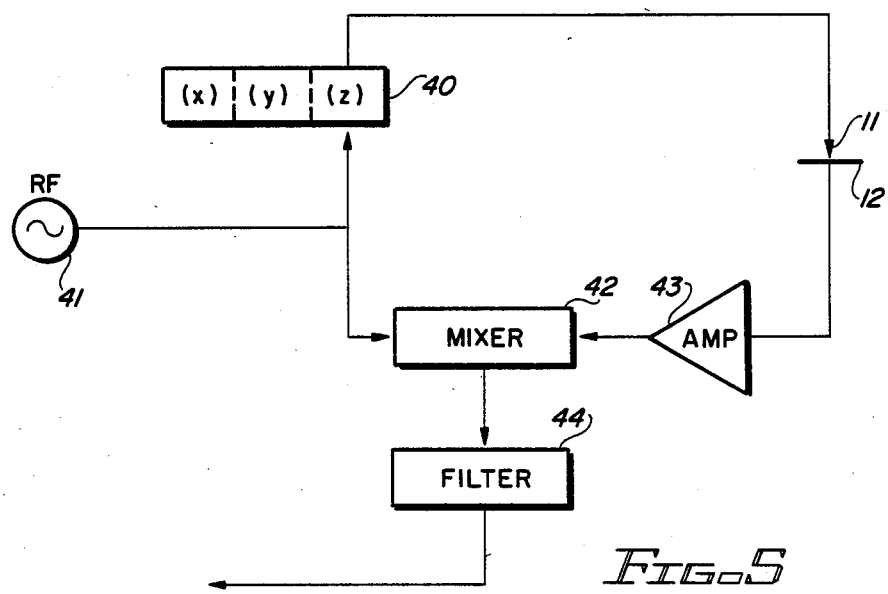
FIG. 5 schematically depicts apparatus for determining the slope, dI/ds, using a mixer.

The current is detected by read amplifier 15 and supplied via line 16 to means (such as shown in FIGS. 4 and 5 and hereinafter described) to generate a readout signal corresponding to the existing state of the discrete area of the film 12 being read. The magnitude of this readout signal denotes whether the data bits, as read, are "0" or "1".

To selectively erase data bits, a voltage signal E (FIG. 2) of longer duration and lesser amplitude (e.g., 7 volts) is applied to those bits to be erased. This produces a tunneling current of lesser amplitude which is sufficient to resistively heat the selected crystallized spots to a temperature at which they reorder and are restored to their original or normal state, illustratively assumed as crystalline.

In the case of a rotatable direct access data storage device, substrate 13 would be in the form of a disk with the thin film 12 thereon rotated past tip 11. Preferably, to reduce access and processing time, there would be a separate probe for each data track, with the respective tips spaced circumferentially around the disk for compactness. This permits writing data bits in selectable tracks and at selectable points along the track without requiring movement of the probe in the x or y direction.

The aforementioned copending application, U.S. Ser. No. 07/090,636, filed Aug. 28, 1987 discloses compound materials (as opposed to nonstochiometric alloys) that are reversible and stable and excellent for achieving fast amorphous-to-crystalline phase transformations. These include GeTe, $(GeTe)_{100-z}Sn_z$, where z is between 0 and 30, $Sb_2Te_3$, GaSb, $Sb_2Se$, SnTe, PbTe, SbSe, BiSe, GeSe, $Te_{50}Ge_{(50-x)}Sn_x$, where x is between 0 and 10, and $Ga_{100-y}In_y)Sb$, where y is between 0 and 100. Other materials especially suitable for this STM implementation are doped and undoped Ge and Si, because their electrical properties (as distinguished from optical properties) change significantly according to the state of the material. A material useful for stable crystalline-to-metastable crystalline phase transformation is AgZn.

These materials provide phase transformations that, according to the invention, significantly modify their electronic properties such as conductance, work function, and/or band gap, thereby providing a good contrast mechanism. For example, GeTe material in the amorphous state is a semiconductor material with a band gap of approximately 0.8 volts, whereas in the crystalline state it is nearly metallic with less than 0.1 volt band gap. This difference in band gap between the two states gives rise to significantly different conductance when tunneling into the two different states.

STM devices have heretofore been operated in a constant tunneling current (terrain following) mode, such as described in U.S. Pat. No. 4,724,318 to read surface contour. Alternatively, they have been operated in a variable current mode in which the probe tip does not move toward or away from the surface, and changes in current are used to sense the surface configuration. This variable current mode is described, for example, as "another embodiment" in the above-cited U.S. Pat. No. 4,575,822. Both these modes, when used to read data by sensing only tunneling current, are undesirably sensitive to topographical surface blemishes.

PREFERRED IMPLEMENTATION - WRITING AND READING

Referring now to FIG. 4, to write data in a discrete area of film 12, write data from an encoder (not shown) that optimizes error rate and bit density is passed to read/write/erase circuitry 30. Circuitry 30 comprises drivers to provide the normal read voltage R, write pulse W and erase pulse E (see FIG. 2).

The tip 11 is preferably positive relative to the polarity of film 12 so that the electrons will be emitted from the film. The electron bombardment of the tip 11 desirably will help keep it sharp. Also, there will be no back scattering of electrons from the film, and no broadening of the written areas.

Figure 3B:
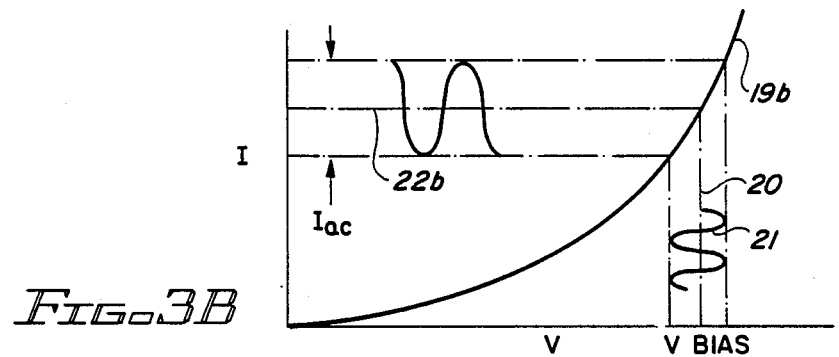

To read the data, variable current mode or constant current mode may be used. However, for high data rates the variable current mode is preferred. The reading characteristics of these state-transformable materials can be understood using the approximate equation for tunneling current, based upon the article by Binnig and Rohrer in IBM Journal of Research and Development, Vol. 30, No. 4, page 355 (1986):

$$I \approx f(V) e^{-ks\sqrt{\Phi}} \tag{1}$$

where I is the tunneling current; f(V) is a function which depends on the applied tip-to-film voltage V; and k is a constant. The tunneling characteristics depend on the electronic properties of the film material, which, in turn, depend on the state of the material. In particular, f(V) and $\Phi$ are state dependent. An example of state-dependent tunneling characteristics is seen in FIGS. 3A and 3B, where current vs. voltage characteristics are shown for two states of the material GeTe. In the crystalline state, a linear current vs. voltage characteristic 19a is observed, whereas in the amorphous state a dramatic curvature 19b is seen.

As evident in expression (1), the current I depends on the state of the film material and can, in principle, be used for readout of the stored data. Note, however, that this expression for current contains an exponential dependence on tip-to-film distance, s. This renders this direct method for readout undesirably sensitive to the effect of topographical blemishes on the film.

READING BY MEASURING dI/dV

One mode for reading which distinguishes between the states of the material is to measure the slope, dI/dV, of the current vs. voltage characteristic. Using expression (1) and differentiating I with respect to V yields:

$$\frac{dI}{dV} = f'(V) e^{-ks\sqrt{\Phi}} = \frac{f'(V)}{f(V)} I \tag{2}$$

where f'(V) is the derivative of f(V) with respect to V and depends on the state of the material. Note that, unlike I, dI/dV does not depend on the tip-to-film spacing, s, if I is constant. Thus, when the data is read by using dI/dV in constant current mode, undesirable sensitivity to topographical surface blemishes will be significantly reduced. For best results, the slope, dI/dV, of the current vs. voltage curve is measured at a selected bias voltage where the slopes differ significantly according to state of the material. We found by actual test, while maintaining the tunneling current constant, that it is possible to distinguish between the crystalline and amorphous states.

According to the invention, a voltage is applied between tip 11 and film 12. As illustrated in FIGS. 3A and 3B, this voltage consists of a DC bias 20 with a superimposed oscillating voltage 21. A signal proportional to dI/dV is obtained by measuring the amplitude of the oscillatory (AC) component in the tunneling current, as shown at 22a and 22b for the crystalline and amorphous states, respectively. Note that the bias voltage remains constant irrespective of the state to be sensed. This technique can be used as long as there is any difference in the dI/dV slope at a particular DC bias voltage for the two states of the material.

To read discrete areas, the output of circuitry 30 (FIG. 4) is amplified and added at 31 with the oscillating voltage signal 21 (FIGS. 3A,B) from an RF generator 32 and supplied to tip 11. The output of generator 32 (which is the oscillating voltage 21 in FIGS. 3A,B) is also supplied to the local oscillator (reference) port of a mixer 33.

As tip 11 encounters a bit to be read, the AC tunneling current is changed as a result of the changed conductance. The current is amplified at 34 and transmitted to mixer 33, which acts as a synchronous detector. The detected signal from mixer 33 is proportional to the amplitude of the AC tunneling current. This signal is passed through filter 35 to line 35a via which it is transmitted to suitable means (not shown) that digitize, decode and gate out the read data responsively to clock pulses. The output from filter 35 thus is proportional to dI/dV. In the case of GeTe, for example, the output has an amplitude 22a or 22b (FIGS. 3A,B) according to whether tip 11 is sensing a crystalline area (0) or an amorphous area (1).

If preferred, the circuitry illustrated in FIG. 4 may be modified by eliminating mixer 33 and substituting, between the output of amplifier 34 and filter 35, a bandpass filter and rectifier (not shown). The rectified output signal is proportional to the AC tunneling current and differs in magnitude for the crystalline and amorphous states, differentiating in this manner between binary 0's and binary 1's.

For the state-transformable materials disclosed, there is a DC operating bias voltage 20 (FIGS. 3A,B) which we found to be about 0.8 volt, at which the current for the crystalline and amorphous states is essentially the same. Thus, tip 11 need not be moved in the z direction (toward and away from film 12) during reading while passing from one state to the other. This desirably lessens the required bandwidth of the z-motion-controlling servo to read at a given speed.

ACTUAL TEST RESULTS

The reversibility and readability of the STM/state-change recording technique was demonstrated by actual test using GeTe as the storage medium. Amorphous states were induced under tip 11 by applying high voltage short pulses of positive polarity; more specifically, 8 volts for 30–50 nanoseconds. Crystallization was induced with slightly lower voltages and longer pulses; more specifically, 7 volts and 100–1000 nanoseconds. Readback was effected by measuring dI/dV, as above; the amorphous and crystalline states of the material were readily distinguished.

READING BY MEASURING (dI/dV)/I

For the highest data rates, the variable current-constant gap mode preferably is used. By measuring (dI/dV)/I, it is possible to achieve the same immunity from topographical blemishes in the surface of film 12 as above described for dI/dV. Using expression (2), (dI/dV)/I=f'(V)/f(V), which is independent of the tip-to-film spacing.

To measure (dI/dV)/I, FIG. 4 is modified as denoted by dash lines to connect the output of read amplifier 34 via a filter 36 to a divider circuit 37 to provide the I input to said circuit; and line 35a which transmits the dI/dV output of filter 35 is now connected to divider circuit 37. The (dI/dV)/I output of divider circuit 37 is thus transmitted via line 37a (instead of 35a) to the aforementioned means (not shown) for digitizing, decoding and gating out the read data responsively to clock pulses.

READING BY MEASURING dI/ds

If desired, an alternative technique, illustrated in FIG. 5, may be used for reading. It involves modulating the spacing between tip 11 and film 12 and measuring dI/ds in the constant current mode.

Using expression (1), $$dI/ds = -k\sqrt{\Phi}\, I,$$

which is independent of the spacing s and depends on work function which is state dependent. Because dI/ds is independent of s, in the constant topographical surface blemishes.

To implement the dI/ds reading method, a controller 40 connected to an RF generator 41 modulates a piezoelectric element (not shown) in the z direction to control motion of the tip 11 in said direction, in the manner described in the above-cited U.S. Pat. No. 4,724,318. The output of generator 41 is also supplied to the local oscillator (reference) port of mixer 42. As tip 11 encounters various material states during reading, the AC tunneling current is changed as a result of the changed work function. The current is amplified at 43 and transmitted to mixer 42, which acts as a synchronous detector. As in the embodiment of FIG. 4, the combined signal from mixer 42 is passed through a filter 44 and suitably (by means not shown) digitized, decoded and gated out responsively to clock pulses. The output from filter 44 thus is proportional to dI/ds.

As in the implementation depicted in FIG. 4, the circuitry shown in FIG. 5 may be modified by eliminating mixer 42 and substituting, between the output of amplifier 43 and filter 44, a bandpass filter and rectifier (not shown). The rectified output signal is proportional to the AC tunneling current and differs for the crystalline and amorphous states thus providing a means to differentiate between binary 0's and 1's.

READING BY MEASURING (dI/ds)/I

For high data rates, the quantity (dI/ds)/I can be measured in the variable current mode. Using expression (1), this quantity is given by $$(dI/ds)/I = -k\sqrt{\Phi},$$

and thus is independent of tip-to-film spacing. By measuring (dI/ds)/I, similar immunity from topographical blemishes in the film surface is achieved as for the dI/ds or dI/dV. This reading method may be implemented by dividing the output of filter 44 in FIG. 5 by a signal proportional to the current I in a manner similar to that described for the implementation in FIG. 4.

Alternatives

In the preceding description, it was illustratively assumed that the normal (unwritten) state of the film 12 was crystalline. However, if desired, the film in its unwritten state may be amorphous and transformed to its crystalline state during writing. In either case, the film is erasable and reusable because the disclosed materials may be transformed back and forth between these states. Moreover, if preferred, the (dI/dV)/I or (dI/ds)/I signal may be digitized before (instead of after as illustrated) the division operation effected by divider circuitry, such as 37.

SUMMARY

It will now be seen that, according to the invention, writing is effected by changing an electronic property of the storage material, examples of which were conductance, work function or band gap; and the change in this electronic property is sensed for readout (rather than a change in optical properties). Also, the process and materials used enable erasure of data and rewriting and reuse of the storage material.

While the invention has been shown and described with reference to preferred embodiments thereof, it will be understood by those skilled in the art that other changes in form and detail may be made therein without departing from the spirit, scope and teaching of the invention. Accordingly, the method herein disclosed are to be considered merely as illustrative and the invention is to be limited only as specified in the claims.

We claim:

1. A method of recording and reading data bits in a data storage device, said method comprising the steps of:

providing a storage medium comprising a substrate and a film of state-transformable material thereon;

using an STM probe tip and voltage pulses that induce current pulses of sufficient magnitude, selectively heating discrete areas of the film to a preselected temperature, and then cooling said areas at a rapid rate for changing the material in said areas from a first state to a second state wherein an electronic property is changed in said discrete areas from one value to a substantially different value, for thereby causing data bits to be written at said areas; and using the probe tip and tunneling current sensing circuitry, sensing the film for reading data bits at said discrete areas where said electronic property had been changed to said different value.

2. The method of claim 1, further including the step of:

using the probe tip and a voltage pulse that induces a current of sufficient magnitude, heating selected discrete areas of the film to a temperature lower than said preselected temperature for a period of time sufficient to allow the material to return to said first state and restore said electronic property to substantially said one value, for thereby causing selective erasure of data bits at said selected discrete areas.

3. The method of claim 1, wherein following each such selective heating, the material and substrate in combination inherently dissipate heat at said rapid rate to inhibit restoration of the material to its first state.

4. The method of claim 1, wherein said preselected temperature is above the melting temperature of the material.

5. The method of claim 1, wherein said film material is stable in one of said states and metastable in the other of said states.

6. The method of claim 1, wherein said film material is crystalline in one of said states and amorphous in the other of said states.

7. The method of claim 1, wherein said film material is stable crystalline in one of said states or metastable crystalline in the other of said states.

8. The method of claim 1, wherein the electronic property is taken from the group consisting of conductance, work function and band gap.

9. The method of claim 1, further including the steps, during the sensing step, of:
applying to the tip a DC bias voltage at which the slope, dI/dV, of the current vs. voltage curve for the film differs significantly according to the state of the film;
superimposing an AC voltage on the DC bias voltage; and
sensing the amplitude of the AC component of the readout signal from the film, and hence the value of dI/dV, to determine the conductance and hence state of the discrete areas.

10. The method of claim 9, further including the step of:
operating the STM probe in constant current mode, whereby the effect of blemishes in topography of the film on said readout signal is minimized.

11. The method of claim 9, further including the step, during amplitude sensing, of:
mixing and then filtering the AC voltage signal and the readout signal from the film to provide the dI/dV readout signal.

12. The method of claim 9, further including the steps of: operating the STM probe in a variable current mode;
sensing the STM tunneling current, I, as read from the film; and
passing said current, I, and the dI/dV signal through divider circuitry to provide a (dI/dV)/I readout signal in which the effect of blemishes in the topography of the film is minimized.

13. The method of claim 1, further including the steps, during the sensing step, of:
modulating the spacing, s, between the tip and film;
measuring the tunneling current, I; and
measuring dI/ds to provide a readout signal indicative of changes in work function of the film and hence the state of the discrete areas.

14. The method of claim 13, further including the step of:
operating the STM probe in a constant current mode; whereby the effect of blemishes in topography of the film on said readout signal is minimized.

15. The method of claim 13, further including the steps of:
operating the STM probe in a variable current mode; and
measuring (dI/ds)/I to provide a readout signal in which the effect of blemishes in topography of the film is minimized.

16. The method of claim 1, wherein the probe tip is positive relative to the polarity of the film.

17. The method according to claim 1, wherein the film material is taken from the group consisting of GeTe, $(GeTe)_{100-z}Sn_z$, where z is between 0 and 30, $Sb_2Te_3$, GaSb, $Sb_2Se$, SnTe, PbTe, SbSe, BiSe, GeSe, $Te_{50}Ge_{(50-x)}Sn_x$, where x is between 0 and 10, where y is between 0 and 100, and doped and undoped Ge and Si.

18. The method of claim 7, wherein the film material comprises AgZn.

* * * * *